United States Patent
Lavigne et al.

(10) Patent No.: US 12,286,693 B2
(45) Date of Patent: Apr. 29, 2025

(54) CEMENTED CARBIDE FOR HIGH DEMAND APPLICATIONS

(71) Applicant: HYPERION MATERIALS & TECHNOLOGIES (SWEDEN) AB, Stockholm (SE)

(72) Inventors: Olivier Lavigne, Barcelona (ES); Olivier Ther, Sant Fost de Campsentelles (ES)

(73) Assignee: HYPERION MATERIALS & TECHNOLOGIES (SWEDEN) AB, Stockholm (SE)

( * ) Notice: Subject to any disclaimer, the term of this patent is extended or adjusted under 35 U.S.C. 154(b) by 540 days.

(21) Appl. No.: 17/291,111

(22) PCT Filed: Nov. 28, 2019

(86) PCT No.: PCT/IB2019/060286
§ 371 (c)(1),
(2) Date: May 4, 2021

(87) PCT Pub. No.: WO2020/128689
PCT Pub. Date: Jun. 25, 2020

(65) Prior Publication Data
US 2022/0002846 A1    Jan. 6, 2022

(30) Foreign Application Priority Data
Dec. 18, 2018  (GB) ................................ 1820628

(51) Int. Cl.
*C22C 29/08* (2006.01)
*B22F 3/12* (2006.01)
*B23B 27/14* (2006.01)
*C22C 29/06* (2006.01)
*E21B 34/00* (2006.01)

(52) U.S. Cl.
CPC ................ *C22C 29/08* (2013.01); *B22F 3/12* (2013.01); *B23B 27/148* (2013.01); *C22C 29/067* (2013.01); *E21B 34/00* (2013.01)

(58) Field of Classification Search
None
See application file for complete search history.

(56) References Cited

U.S. PATENT DOCUMENTS 4,497,660 A * 2/1985 Lindholm .............. C22C 29/067
                                                    75/242
5,902,942 A * 5/1999 Maderud ................ C22C 29/08
                                                    419/33

(Continued)

FOREIGN PATENT DOCUMENTS

CN  101074467 A  11/2007
CN  101745933 A   6/2010

(Continued)

*Primary Examiner* — George Wyszomierski

(57) ABSTRACT

Provided is a corrosion and erosion resistant cemented carbide for high demand including, for example, oil and gas flow applications. The cemented carbide grade may include, for example, including the following constituents Co, Ni, Cr, Mo and WC. The binder phase content of the cemented carbide is between 5.1 to 7.5 wt %. The wt % of Co in the cemented carbide may be less than the wt % of Ni.

11 Claims, 1 Drawing Sheet

(56) References Cited

U.S. PATENT DOCUMENTS

| | | | | |
|---|---|---|---|---|
| 2002/0059849 A1* | 5/2002 | Perez | ........................ | B21C 3/02 |
| | | | | 75/240 |
| 2002/0152840 A1* | 10/2002 | Ederyd | ................ | F16J 15/3496 |
| | | | | 75/240 |
| 2010/0154607 A1* | 6/2010 | Carpenter | ................ | C22C 29/08 |
| | | | | 83/13 |
| 2012/0093597 A1 | 4/2012 | Ederyd | | |
| 2012/0210822 A1* | 8/2012 | Konyashin | .............. | C22C 1/051 |
| | | | | 977/773 |
| 2021/0040587 A1* | 2/2021 | Yamanishi | ................ | C22C 1/051 |

FOREIGN PATENT DOCUMENTS

| | | | |
|---|---|---|---|
| EP | 0028620 | A1 | 5/1981 |
| JP | S563648 | A | 1/1981 |
| JP | H10298698 | A | 11/1998 |
| WO | 9213112 | A | 8/1992 |

* cited by examiner

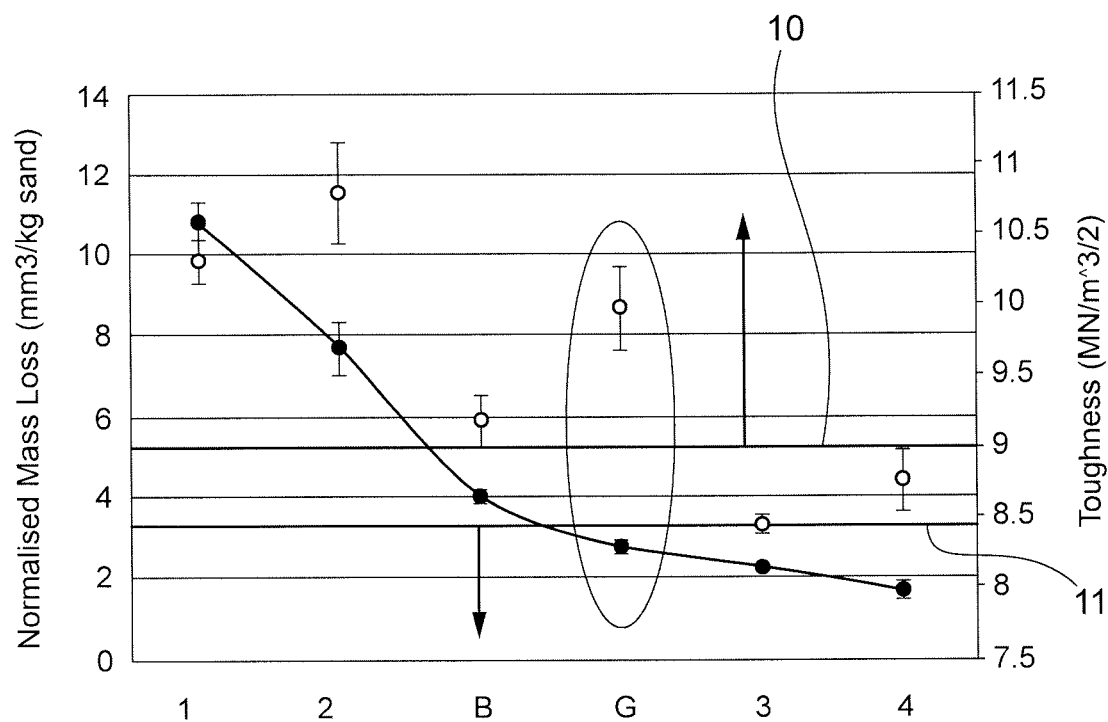

CEMENTED CARBIDE FOR HIGH DEMAND APPLICATIONS

This is a National Phase Application filed under 35 U.S.C. 371 as the national stage of PCT/IB20191060286, filed on Nov. 28, 2019, an application claiming the benefit of Great Britain Patent Application No. 1820628.4, filed on Dec. 18, 2018, the entire content of each of which is hereby incorporated by reference in its entirety.

FIELD OF DISCLOSURE

The present subject matter relates to a wear resistant cemented carbide and method of manufacture for high demand applications and in particular although not exclusively to a corrosion and erosion resistance cemented carbide having a relatively high toughness for a given hardness.

BACKGROUND

Cemented carbides have been used extensively for high demand applications such as tools for cutting, machining, drilling or degrading rock. These high wear resistant carbides have found particular application as components within the oil and gas industry where they are used typically for a variety of fluid flow control components including for example choke and control valves, cages, valve seats and seal rings. Their suitability is due largely to their physical and mechanical characteristics including in particular hardness, toughness, strength and wear resistance. Within physical high demand oil and gas applications, conventional cemented carbide components have relatively short lifetimes. Additionally, prediction of in-service performance and the liability is critical due to limited accessibility (e.g. subsea environments) and the extensive production downtime for servicing.

Flow control components within oil and gas production systems are typically subjected to high fluid velocity flows (>200 m/s) where the fluid is typically mixed sand/oil/gas/water at variable humidity, flow rate and pH. Operating conditions can also include 'sour' conditions that include in particular exposure to $H_2S$ with an associated increased likelihood of corrosion, pitting and stepwise cracking.

The increasing challenging conditions of operation (including specifically high variability of the flow media and the extreme high pressure and high temperature) together with the deep-water environment mean that conventional components have a short service lifetime and are susceptible to high rates of failure.

WO 2012/045815 describes a cemented carbide material for oil and gas applications in which a hard phase is combined with a binder phase including Ni, Co, Cr, Mo and Nb in an attempt to provide improved physical and mechanical properties to maximise service lifetime.

WO 00/000655 discloses a cemented tungsten carbide material for corrosion-erosion resistance when implemented as a choke valve to control a flow of media with the material including Co, Ni, Cr, Mo and balance WC.

EP 1413637 also discloses a cemented tungsten carbide grade for oil and gas applications based on Co, Ni, Cr, Mo and balance WC.

However, under certain circumstances within oil and gas fluid flow control, existing cemented carbides are not optimised for corrosion and mechanical resistance. In particular, existing cemented carbides exhibit an unsatisfactory rate of failure when the flow conditions include an acidic media and there are intermittent impacts at the respective component part by large solid particles.

SUMMARY

The present disclosure is directed to cemented carbide materials suitable for high demand applications and in particular for use as a constituent or primary material for a component part of such high demand applications. Also provided are cemented carbides having desired toughness, hardness, strength and wear resistant properties to withstand challenging environmental and operative conditions. Also provided are cemented carbides suitable for use as a tool for metal forming or as a wear part within fluid handling applications. Also provided are cemented carbides suitable for use as a component part within oil and gas production including in particular use as a fluid flow component.

The objectives are achieved by a cemented carbide material having a relatively high hardness, toughness and transverse rupture strength (TRS). In particular, cemented carbide materials according to the present disclosure may comprise a hardness in a range 1600 to 2000 HV30 (ISO 3878:1983). Additionally, the present cemented carbide may comprise a toughness between 9 to 12 $MN/m^{3/2}$ (Palmqvist, ISO 28079:2009). Additionally, the present cemented carbides may comprise a TRS of greater than 3000 $N/mm^2$ (ISO 3327:2009).

There is provided a cemented carbide comprising a hard phase including WC and a binder phase characterised in that: the binder phase content of the cemented carbide is between 5.1 to 7.5 wt %; the cemented carbide comprises in wt % 1.7-3.3 Co; 2.0-3.7 Ni; 0.5-1.1 Cr, 0.05-0.4 Mo and 90.0-96.0 WC; and wherein wt % Co is always less than wt % Ni.

Optionally, the cemented carbide comprises WC as balance wt %.

In particular, the inventors have identified that the recited elemental composition of the cemented carbide including a hard phase WC and a binder phase in which the wt % of Co is always less than the wt % Ni, provides the desired and advantageous hardness, toughness wear resistant and corrosion resistance properties. Accordingly, a highly erosion resistant material is provided suitable for use as a component within high demand oil and gas fluid flow applications.

Moreover, elemental compositions of the cemented carbide preferably comprise wt % 1.7-3.3 Co; 2.0-3.7 Ni; 0.5-1.1 Cr, 0.05-0.4 Mo. In particular, in some aspects substantially all, a majority or a predominant component in wt % of Co, Ni, Cr and Mo are present within the binder phase. That is, in certain embodiments, a minor or relatively low amount (i.e. wt % less than 10, 5, 2 or 1%) of the total wt % amount of each of Co, Ni, Cr and/or Mo may be present outside/beyond of the binder phase. Such minor amounts may be present at the grain boundaries between the hard phase and the binder phase or within the hard phase.

The cemented carbide comprises Cr, Mo and W in any one or in combination of free/elemental form, or as a compound in combination with any or a combination of the other constituents of the cemented carbide.

Optionally, there is provided a cemented carbide comprising a hard phase including WC and a binder phase characterised in that: the binder phase content of the cemented carbide is between 5.1 to 7.5 wt %; the cemented carbide consists of in wt % 1.7-3.3 Co; 2.0-3.7 Ni; 0.5-1.1 Cr, 0.05-0.4 Mo and 90.0-96.0 WC; and wherein wt % Co is less than wt % Ni.

Optionally, the hard phase of the cemented carbide is at least 87, 89, 90, 92, 93, 94, 95, 96 wt %. Optionally, the amount of WC in the cemented carbide is at least 90 wt % or in a range 90 to 96 or 91 to 95 wt %.

Optionally, the cemented carbide is devoid of nitrides and/or carbonitrides. Optionally, the cemented carbide may comprise nitrides and/or carbonitrides present at impurity level. Optionally, the impurity level of such nitrides and/or carbonitrides is less than 0.05, 0.01 or 0.001 wt %. Optionally, the cemented carbide is devoid of Ti and carbides, nitrides and/or carbonitrides of Ti. Preferably, the cemented carbide comprises 0 wt % Ti so as to be compositionally free of Ti.

Optionally, a carbon content within the sintered cemented carbide is maintained within a predetermined range to further contribute to the high corrosion resistance, wear resistance and toughness. Optionally, the carbon content of the sintered material may be held in a range between free carbon in the micro structure (upper limit) and a point of eta-phase initiation (lower limit). Such limits will be appreciated by those skilled in the art.

Optionally, a magnetic saturation of the magnetic binder phase of the sintered carbide may be expressed as a percent of a maximum 'expected' magnetic saturation of 'pure' cobalt content contained within the carbide. According to aspects of the present invention, the sintered carbide may comprise a magnetic saturation at between 50 to 100% of the chemically determined content.

Optionally, a quotient wt % Co/Ni in the cemented carbide is 0.50 to 0.95. The relative amount of Co:Ni provides the enhanced corrosion resistance and in particular dry erosion resistance of primarily gas extract applications. Preferably, the quotient wt % of Co/Ni may be in a range 0.50 to 0.90; 0.55 to 0.85; 0.55 to 0.80; 0.55 to 0.75; 0.60 to 0.75 or 0.60 to 0.70. In particular, a relatively higher wt % of Ni has been found to enhance corrosion resistance specifically in acidic conditions (pH<7).

Optionally, a quotient wt % Cr/(Co+Ni+Cr+Mo) in the cemented carbide is in a range 0.08 to 0.14. This range enhances the corrosion resistance whilst maintaining the desired mechanical properties including hardness and toughness required for high demand applications such as oil and gas.

Optionally, a quotient wt % Mo/(Co+Ni+Cr+Mo) in the cemented carbide is in a range 0.01 to 0.06. This range enhances the corrosion resistance whilst maintaining the desired mechanical properties including hardness and toughness required for high demand applications such as oil and gas.

Optionally, the binder phase of the cemented carbide is at least 4 wt % or in a range 4 to 8 or 4 to 7. The amount (wt %) of binder phase relative to the WC hard phase has been found to enhance toughness whilst maintaining hardness to an appropriate level for high demand applications. The relative binder content also provides a contribution to the enhanced corrosion resistance (in particular dry erosion resistance).

Optionally, the Co+Ni content in the cemented carbide is at least wt % 4 or in a range 4 to 8, 4 to 7 or 5 to 6.5. Such a configuration provides a contribution to the increased toughness of the present material.

Optionally, a grain size of the WC may be in the range 0.2 to 2 µm, 0.2 to 1 µm or 0.4 to 0.8 µm of the sintered material determined by linear intercept. Optionally, a FSSS grain size of the starting WC material may be in the range 0.4 to 2 µm. Such grain sizes provide enhanced toughness whilst maintaining hardness. Preferably, the grain size of the WC within the sintered material measured by linear intercept is in the range 0.3 to 0.9 µm.

Optionally, Co is included in the range wt % 1.7 to 3.3, 2.0 to 2.6. 2.1 to 2.5 or 2.2 to 2.4. Optionally, the cemented carbide comprises Ni in the range wt % 3.3 to 3.7 or 3.4 to 3.6. Optionally, the cemented carbide comprises Cr in the range wt % 0.7 to 1.0, 0.75 to 0.95 or 0.8 to 0.9. Optionally, the cemented carbide comprises Mo in the range wt % 0.1 to 0.4.

Optionally, there is provided a cemented carbide comprising a hard phase including WC and a binder phase characterised in that: the binder phase content of the cemented carbide is between 5.1 to 7.5 wt %; the cemented carbide comprises in wt % 1.7-3.3 Co; 2.0-3.7 Ni; 0.5-1.1 Cr, 0.05-0.4 Mo and WC included as balance; and wherein wt % Co is less than wt % Ni.

There is also provided a component for oil and gas applications comprising a cemented carbide as claimed herein. Optionally, the component may comprise any one of a choke valve, a control valve, a valve seat, a plug seat, a frac seat, a cage, a cage assembly, a seal ring, a component part of a valve to allow the through-flow of a fluid and/or a slurry.

Also provided is a composition suitable for demanding high wear applications such as use as a tool for metal forming or as a wear part with fluid flow applications. According to one aspect, the present cemented carbide may be used as a tool for metal forming including in particular use as a die, an ironing die, a die for wire drawing or other component within metal forming. According to one aspect, the present cemented carbide may be used as a fluid flow control component.

Also provided is a method of making a cemented carbide comprising a hard phase including WC and a binder phase, the method comprising and characterised by: preparing a powdered batch comprising raw materials in wt % 1.7-3.3 Co; 2.0-3.7 Ni; 0.5-1.1 Cr, 0.05-0.4 Mo and WC included as balance wherein wt % Co is always less than wt % Ni; pressing the powdered batch to form a pre-form; and sintering the pre-form to form the article; wherein the binder phase content of the cemented carbide is between 5.1 to 7.5 wt %.

Also provided is a method of making a cemented carbide comprising a hard phase including WC and a binder phase, the method comprising and characterised by: preparing a powdered batch comprising raw materials in wt % 1.7-3.3 Co; 2.0-3.7 Ni; 0.5-1.1 Cr, 0.05-0.4 Mo and 90.0-96.0 WC; wherein wt % Co is less than wt % Ni; pressing the powdered batch to form a pre-form; and sintering the pre-form to form the article; wherein the binder phase content of the cemented carbide is between 5.1 to 7.5 wt %.

Optionally, the step of sintering the pre-form to form the article comprises vacuum or HIP processing. Optionally, the sintering processing comprises processing at a temperature 1360-1500° C. and a pressure 0-20 MPa.

There is also provided an article for high demand applications manufactured by the method as described herein.

There is also provided a cemented carbide article obtainable by the method as described herein.

Optionally, the Cr may be added to part of the powdered batch in the form $Cr_3C_2$. Optionally, the method may comprise adding elemental Cr. According to such implementations, the method may further comprise adding additional carbon so as to achieve the desired wt % carbon within the sintered cemented carbide in a range between free carbon in the microstructure (upper limit) and eta-phase initiation (lower limit) as will be appreciated by those skilled in the art. Optionally, the FSSS WC particle size within the powdered batch may be in the range 0.4 to 2 µm.

Optionally, the present cemented carbide is a tungsten cemented carbide.

The present cemented carbide may further comprise carbides, nitrides and/or carbonitrides selected from the group of tungsten, titanium, chromium, vanadium, tantalum, neodymium and molybdenum. Such components may be added to the powder batch as minor wt % additives relative to WC that preferably is included within the cemented carbide as a majority or predominant wt % component relative to other components of the material.

Optionally, the cemented carbide is devoid of nitrogen or nitrogen compounds. However, the cemented carbide may comprise nitrogen or nitrogen compounds such as nitrides at impurity level such as less than 0.1 wt %, 0.05 wt % or 0.01 wt %.

Optionally, there is provided a cemented carbide comprising a hard phase including WC and a binder phase characterised in that: the binder phase content of the cemented carbide is between 5.1 to 7.5 wt %; the cemented carbide consists of in wt % 1.7-3.3 Co; 2.0-3.7 Ni; 0.5-1.1 Cr, 0.05-0.4 Mo and 90.0-96.0 WC and optionally any one or a combination of Fe, Co, Ti, Nb, Ta, V, Re, Ru, Zr, Al and/or Y at impurity levels; and wherein wt % Co is less than wt % Ni.

Optionally, the present cemented carbide may further include any of Fe, Ti, Nb, Ta, V, Re, Ru, Zr, Al and/or Y at impurity levels. These elements may be present either in elemental, carbide, nitride or carbonitride form. The impurity level is a level such as less than 0.1 wt % or 0.5 wt % for the total amount of impurities present within the cemented carbide Preferably the cemented carbide comprises exclusively carbides. Preferably the cemented carbide comprises WC as a predominant wt % carbide component. Optionally, the cemented carbide may comprise minority wt % carbides of any one or a combination of Mo and Cr.

The cemented carbide typically further comprises metallic phase components including iron, nickel, cobalt, molybdenum or combinations thereof. Such components may be present within the binder phase.

BRIEF DESCRIPTION OF DRAWINGS

A specific implementation of the present invention will now be described, by way of example only, and with reference to the accompanying drawings in which:

FIG. 1 is a graph of normalised mass loss and toughness for different example materials according to aspects of the present invention in addition to comparative examples.

DETAILED DESCRIPTION

A wear resistant cemented carbide grade is provided with relative high toughness and exhibiting enhanced corrosion and erosion resistance. The inventors have identified that such physical and mechanical characteristics may be achieved via a binder phase content relative to a WC hard phase of in the range 5.1 to 7.5 wt % and in which the cemented carbide has a wt % composition 1.7-3.3 Co; 2.0-3.7 Ni; 0.5-1.1 Cr, 0.05-0.4 Mo with 90.0-96.0 WC. A contribution to the desired physical and mechanical characteristics may be achieved also by controlling the amount of Co relative to Ni and in particular by maintaining a wt % Co being less than wt % Ni.

The present cemented carbide is specifically adapted for potential high wear and high demand applications including use as a component within oil and gas production with such components being susceptible to corrosion and mechanical erosion. Additionally, the present carbide is also suitable for the use as a tool for metal forming.

Examples

Conventional powder metallurgical methods including milling, pressing, shaping and sinter hipping were used to manufacture a cemented carbide according to the present invention. Cemented carbide materials according to the present invention were prepared in addition to comparative test coupons.

Each of the sample mixtures Grades A to I were prepared from powders forming the hard constituents and powders forming the binder. The following preparation method corresponds to Grade B of Table 1 below having starting powdered materials: WC 95.24 g, Cr3C2 0.82 g, Co 2.05 g, Ni 3.58 g, C 0.05 g, Mo 0.31 g, PEG 2 g, Ethanol 50 ml. It will be appreciated by those skilled in the art that it is the relative amounts of the powdered materials that allow the skilled person and suitable adjustment is needed to make the powdered batch and achieve the final fully sintered composition of the cemented carbides of Table 1.

The powders were wet milled together with the lubricant and the anti-flocculating agent until a homogeneous mixture was obtained and granulated by drying and sieving. The dried powder was pressed to form a green part according to the abovementioned standard shapes and sintered using SinterHIP at 1350-1500° C. and 5 MPa.

Table 1 details composition (wt %) together with additional characterisations of grades A to I in accordance with the present invention.

TABLE 1

Example grade material compositions A to I according to the present invention.

| | Composition, wt % | | | | | Total binder | WC Raw Material | Cr$_3$C$_2$/ Binder | Mo/ Binder | |
|---|---|---|---|---|---|---|---|---|---|---|
| Grade | WC | Co | Cr$_3$C$_2$ | Ni | Mo | wt % | um | Tot | Tot | Co/Ni |
| A | 93.80 | 1.75 | 0.75 | 3.50 | 0.20 | 6.20 | 0.8 | 0.12 | 0.03 | 0.50 |
| B | 93.40 | 2.00 | 0.80 | 3.50 | 0.30 | 6.60 | 0.8 | 0.12 | 0.05 | 0.57 |
| C | 93.00 | 3.00 | 0.85 | 3.00 | 0.15 | 7.00 | 0.8 | 0.12 | 0.02 | 1.00 |
| D | 93.80 | 1.75 | 0.75 | 3.50 | 0.20 | 6.20 | 1 | 0.12 | 0.03 | 0.50 |
| E | 93.00 | 3.00 | 0.85 | 3.00 | 0.15 | 7.00 | 1 | 0.12 | 0.02 | 1.00 |
| F | 93 | 2.30 | 1.00 | 3.50 | 0.20 | 7.00 | 0.8 | 0.14 | 0.03 | 0.66 |
| G | 93 | 2.30 | 1.00 | 3.50 | 0.20 | 7.00 | 1 | 0.14 | 0.03 | 0.66 |

TABLE 1-continued

Example grade material compositions A to I according to the present invention.

| Grade | Composition, wt % | | | | | Total binder wt % | WC Raw Material um | Cr₃C₂/Binder Tot | Mo/Binder Tot | Co/Ni |
|---|---|---|---|---|---|---|---|---|---|---|
| | WC | Co | Cr₃C₂ | Ni | Mo | | | | | |
| H | 93 | 2.00 | 1.10 | 3.65 | 0.35 | 7.10 | 1 | 0.15 | 0.05 | 0.55 |
| I | 93 | 2.00 | 1.00 | 3.65 | 0.35 | 7.00 | 1 | 0.14 | 0.05 | 0.55 |

Hardness tests were carried out on grades A to I in accordance with ISO 3878 and toughness testing according to Palmqvist, ISO 28079. Vickers indentation test was performed using 30 kgf (HV30) to assess hardness. Palmqvist fracture toughness was calculated according to:

$$K1c = A\sqrt{HV}\sqrt{\frac{P}{\Sigma L}}$$

Where A is a constant of 0.0028, HV is the Vickers hardness in N/mm2, P is the applied load (N) and $\Sigma L$ is the sum of crack lengths (mm) of the imprint. The results are shown in table 2.

TABLE 2

Hardness and toughness tests for sample grades A to I.

| Grade | HV30 | KIC |
|---|---|---|
| A | 1799 | 9.2 |
| B | 1843 | 9.2 |
| C | 1831 | 9.2 |
| D | 1753 | 9.1 |
| E | 1700 | 9.4 |
| F | 1907 | 9 |
| G | 1768 | 10.3 |
| H | 1728 | 9.2 |
| I | 1688 | 9.3 |

Table 3 details example grades B and G together with comparative examples 1 to 4 according to various different compositions and WC starting material particle sizes. It will be appreciated the particle size of the starting material is reduced according to standard milling and sintering procedures such that the grain size of the final fully sintered material (determined by linear intercept) may be less than (up to or approximately half) the particle size of the starting material as determined by Fisher Model 95 Sub-Sieve Sizer™ (FSSS).

The linear intercept method (ISO 4499-2:2008) is a method of measurement of WC grain size. Grain-size measurements are obtained from SEM images of the microstructure. For a nominally two-phase material such as a cemented carbide (hard phase and binder phase), the linear-intercept technique gives information of the grain-size distribution. A line is drawn across a calibrated image of the microstructure of the cemented carbide. Where this line intercepts a grain of WC, the length of the line ($l_i$) is measured using a calibrated rule (where i=1,2,3, . . . n for the first $1^{st}$, $2^{nd}$, $3^{rd}$, . . . , nth grain). At least 100 grains where counted for the measurements. The average WC grain size will be defined as:

$$d_{WC} = \Sigma l_i / n$$

TABLE 3

Compositions of example grades B and G with various comparative examples 1

| Grade | WC | Co | Cr₃C₂ | Ni | Mo | WC Raw Material, um |
|---|---|---|---|---|---|---|
| B | 93.40 | 2.00 | 0.80 | 3.50 | 0.30 | 0.8 |
| G | 93 | 2.30 | 1.00 | 3.50 | 0.20 | 1 |
| Comparative 1 | 87.8 | 3.5 | 1.5 | 7 | 0.2 | 0.8 |
| Comparative 2 | 93.85 | 6 | 0.15 | 0 | 0 | 2 |
| Comparative 3 | 96.95 | 1.9 | 0.35 | 0.7 | 0.1 | 0.9 |
| Comparative 4 | 94.9 | 3.3 | 0.6 | 1.1 | 0.1 | 0.8 |

Hardness (ISO 3878), toughness (Palmqvist, ISO 28079) and TRS (ISO 3327:2009) tests were undertaken on grades B and G (partially), as well as comparative examples to 4. The test pieces for transverse rupture strength's determination were cylinders of Type C (cylindrical cross-section with 40×3 mm2 dimension). The samples were placed between two supports and loaded in their center until fracture occurred (3-points bending). The maximum load was recorded and averaged over minimum five samples per test. The results are sown in table 4 together with respective magnetic cobalt content.

TABLE 4

Physical and mechanical performance test results together with magnetic cobalt content of the grades B and G together with comparative examples 1 to 4.

| Grade | Magnetic Co content, wt % | HV30 | KIC | TRS |
|---|---|---|---|---|
| B | 1.93 | 1843 | 9.2 | 3800 |
| G | 2.00 | 1768 | 10.3 | 3800 |
| Comparative 1 | 2.75 | 1540 | 10.3 | 3300 |
| Comparative 2 | 5.4 | 1549 | 10.8 | 2870 |
| Comparative 3 | 1.75 | 1949 | 8.4 | 3250 |
| Comparative 4 | 3.05 | 1904 | 8.8 | 3800 |

The corrosion rate of grades B and G, and comparative examples 1 to 4 was assessed and the results are shown in table 5. The surface roughness (Ra) of the samples was 0.036 μm.

The corrosion rate in mm/year was estimated by means of mass loss against time of immersion under the following simulated test conditions:
1) Immersion for 212 h in synthetic sea water at pH 6 (3.56% wt. NaCl) at 25° C., in aerated conditions.
2) Immersion for 212 h in synthetic sea water at pH 1 (3.56% wt. NaCl+0.1M H₂SO₄) at 60° C., in aerated conditions.

The mass loss corrosion rate in mm/year was estimated according to the above simulated conditions using the formula (ASTM G31-72 'Standard Practice for Laboratory Immersion Corrosion Testing of Metals'):

Corrosion rate=8.76 10⁴×((weight loss (g)/(exposed surface area (cm²)×density (g/cm³)×immersion time (h))

TABLE 5

Corrosion testing results for grades B & G and comparative examples 1 to 4.

| Grade | Material loss (mm/year) in synthetic seawater at pH6, and 25° C. | Material loss (mm/year) in synthetic seawater at pH1, and 60° C. |
|---|---|---|
| B | $2.05 \times 10^{-3} \pm 0.40 \times 10^{-3}$ | $71.10 \times 10^{-3} \pm 8.72 \times 10^{-3}$ |
| G | $2.00 \times 10^{-3} \pm 0.78 \times 10^{-3}$ | $85.61 \times 10^{-3} \pm 16.1 \times 10^{-3}$ |
| Comparative 1 | $4.14 \times 10^{-3} \pm 0.69 \times 10^{-3}$ | $105.52 \times 10^{-3} \pm 12 \times 10^{-3}$ |
| Comparative 2 | $23.40 \times 10^{-3} \pm 0.52 \times 10^{-3}$ | $163.2 \times 10^{-3} \pm 0.34 \times 10^{-3}$ |
| Comparative 3 | $2.02 \times 10^{-3} \pm 1.42 \times 10^{-3}$ | $64.54 \times 10^{-3} \pm 2.87 \times 10^{-3}$ |
| Comparative 4 | $1.94 \times 10^{-3} \pm 0.96 \times 10^{-3}$ | $94.05 \times 10^{-3} \pm 3.65 \times 10^{-3}$ |

The dry erosion resistance of the grades of table 5 was tested using an air-sand erosion rig, following the ASTM G76-07 ('*Standard Test Method for Conducting Erosion Tests by Solid Particle Impingement Using Gas Jets*'—determination of material loss by gas-entrained solid particle impingement erosion with jet nozzle type erosion equipment) as a guide. The particle size range was 181 μm-251 μm, impact angle 90°, erodent feed rate ~10 g/min, flow velocity 200 f 20 m/s and stand-off distance between the sample and the nozzle 30 mm. The results are shown in Table 6.

TABLE 6

Dry erosion rate expressed as $mm^3$/kg using air/sand erosion for grades B and G and comparative examples 1 to 4.

| Grade | Dry erosion rate ($mm^3$/kg sand) |
|---|---|
| B | 4.01 |
| G | 2.72 |
| Comparative 1 | 10.84 |
| Comparative 2 | 7.65 |
| Comparative 3 | 2.24 |
| Comparative 4 | 1.68 |

The present cemented carbide material according to grade G exhibited high wear (erosion resistance) in combination with enhanced toughness and corrosion resistance. In particular, FIG. 1 is a graph of normalized mass loss and toughness for invention grades B and G and comparative examples 1 to 4. Line 10 is the minimum toughness acceptance limit and line 11 is the minimum dry erosion resistance acceptance limit for high demand oil and gas exploration conditions. As will be noted, sample G satisfies both toughness and dry erosion requirements according to the testing methods described herein.

Unless defined otherwise all technical and scientific terms used herein have the same meaning as commonly understood to one of ordinary skill in the art to which the presently described subject matter pertains.

Unless otherwise indicated, any reference to "wt %" refers to the mass fraction of the component relative to the total mass of the cemented carbide.

Where a range of values is provided, for example, concentration ranges, percentage range or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

It should be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a", "an" and "at least one" are used interchangeably in this application.

Unless otherwise indicated, all numbers expressing quantities of ingredients, properties such as size, weight, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present subject matter. At the very least, and not as an attempt to limit the application of the doctrine of equivalents to the scope of the claims, each numerical parameter should at least be construed in light of the number of reported significant digits and by applying ordinary rounding techniques.

Throughout the application, descriptions of various embodiments use "comprising" language; however, it will be understood by one of skill in the art that, in some instances, an embodiment can alternatively be described using the language "consisting essentially of" or "consisting of".

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

The invention claimed is:

1. A cemented carbide having a hard phase and a binder phase, the cemented carbide consisting of:
   Co present in an amount of 2.3 by wt. % of the cemented carbide;
   Ni present in an amount of 3.5 by wt. % of the cemented carbide;
   $Cr_3C_2$ present in an amount of 1.0 by wt. % of the cemented carbide;
   Mo present in an amount of 0.2 by wt. % of the cemented carbide; and
   WC present in an amount of 93.0 by wt. % of the cemented carbide, wherein the binder phase is present in an amount of from 5.1 to 7.5 by wt. % of the cemented carbide.

2. The cemented carbide of claim 1, wherein a wt. % quotient of Cr/(Co+Ni+Cr+Mo) in the cemented carbide is in a range of from 0.08 to 0.14.

3. The cemented carbide of claim 1, wherein a wt. % quotient of Mo/(Co+Ni+Cr+Mo) in the cemented carbide is in a range of from 0.01 to 0.06.

4. The cemented carbide of claim 1, wherein the WC has a grain size in a range of from 0.2 to 2 μm determined by linear intercept.

5. The cemented carbide of claim 4, wherein the grain size of the WC is in a range of from 0.3 to 0.9 μm determined by linear intercept.

6. A component, comprising a cemented carbide of claim 1.

7. The component of claim 6, comprising a choke valve, a control valve, a valve seat, a plug seat, a frac seat, a cage, a cage assembly, a seal ring, or a component part of a valve to allow the through-flow of a fluid or a slurry.

8. A tool, comprising the cemented carbide of claim 1.

9. A method of making a cemented carbide article having a hard phase and a binder phase, the method comprising:
preparing a powdered batch comprising Co, Ni, $Cr_3C_2$, Mo, and WC;
pressing the powdered batch to form a pre-form; and
sintering the pre-form to form the cemented carbide article,
wherein the binder phase of the cemented carbide article is present in an amount of from 5.1 to 7.5 by wt. % of the cemented carbide article, and
wherein the sintered cemented carbide article has a cemented carbide composition consisting of Co present in an amount of 2.3 by wt. % of the cemented carbide composition, Ni present in an amount of 3.5 by wt. % of the cemented carbide composition, $Cr_3C_2$ present in an amount of 1.0 by wt. % of the cemented carbide composition, Mo present in an amount of 0.2 by wt. % of the cemented carbide composition, and WC present in an amount of 93.0 by wt. % of the cemented carbide composition.

10. The method of claim 9, wherein the sintering the preform to form the article comprises vacuum or HIP processing.

11. The method of claim 9, wherein the sintering comprises processing at a temperature 1360-1500° C. and a pressure 0-20 MPa.

* * * * *